May 28, 1929.   G. A. THORNTON ET AL   1,714,962
MEANS FOR REGULATING SECONDARY CURRENT AND VOLTAGE IN TRANSFORMERS
Filed March 12, 1927   2 Sheets-Sheet 1

INVENTORS
G. A. Thornton
W. Remington
BY Townsend & Decker
ATTORNEYS

May 28, 1929.   G. A. THORNTON ET AL   1,714,962
MEANS FOR REGULATING SECONDARY CURRENT AND VOLTAGE IN TRANSFORMERS
Filed March 12, 1927   2 Sheets-Sheet 2

INVENTORS
G. A. Thornton
W. Remington
BY Townsend+ ATTORNEYS.

Patented May 28, 1929.

1,714,962

UNITED STATES PATENT OFFICE.

GEORGE A. THORNTON, OF SCHENECTADY, NEW YORK, AND WOLCOTT REMINGTON, OF SWAMPSCOTT, MASSACHUSETTS, ASSIGNORS TO THOMSON ELECTRIC WELDING COMPANY, OF LYNN, MASSACHUSETTS, A CORPORATION OF MASSACHUSETTS.

MEANS FOR REGULATING SECONDARY CURRENT AND VOLTAGE IN TRANSFORMERS.

Application filed March 12, 1927. Serial No. 174,778.

This invention relates to current limiting and regulating devices for alternating current electrical apparatus.

It is one of the primary objects of the invention to provide an improved regulating method and apparatus which will produce wide variations in the output of the secondary of a transformer without opening either the primary or secondary circuits.

One of the main objects of the invention is to protect an electric transformer against overload and consequent injury.

A still further object is to provide regulating devices for alternating current electrical apparatus which regulating devices consume a minimum of electrical power.

One of the more specific objects of the invention is to provide for regulating and controlling the output of a transformer, in part, by directly influencing the magnetic lines of force in a transformer core through the use of an auxiliary magnetic circuit and exciting coil.

It is a still further object of the invention to provide an apparatus of this type which may be readily applied to the present types of transformer without material alteration therein.

These and other objects will appear more fully from the following description when considered in connection with the drawings in which.

This invention is illustrated as applied to certain types of transformers it being understood that the invention is adapted to other types and that the present embodiments are merely illustrative of a few of the many applications of the basic principle of the invention.

Considerable difficulty has been experienced in varying the current output of a secondary in certain types of electrical apparatus, for example electric welders, in that the load often reaches a state wherein it is in effect a complete short-circuit for the secondary. Under these conditions, if the transformer is not in some way modified or the current supply otherwise regulated, the excessive current flow in the primary is apt to and often does destroy the primary windings of the transformer with the result that the apparatus must remain idle until it is repaired and new coils installed.

It is relatively easy to make adjustments in a transformer where a time interval would not be particularly objectionable and where the current being supplied is not excessive and sufficient time is allowed in which to make the adjustments. However, where any of these conditions are not favorable, it becomes increasingly difficult if not impossible with the present types of controlling mechanism to vary the output of the transformer under the present working requirements of many types of power apparatus such for example as the present flash or spot welding apparatus without injury to the apparatus or loss of efficiency in performing the work.

According to the present invention we have provided for varying the output of a transformer without open-circuiting the primary or secondary and without the necessity of a time interval between the different adjustments of the apparatus. We are enabled to vary the voltage and current flow in a transformer more rapidly than has heretofore been attainable and entirely without arcing or other objectionable features which might injure the transformer or other apparatus.

These results are attained by the following described mechanism.

Figure 1:
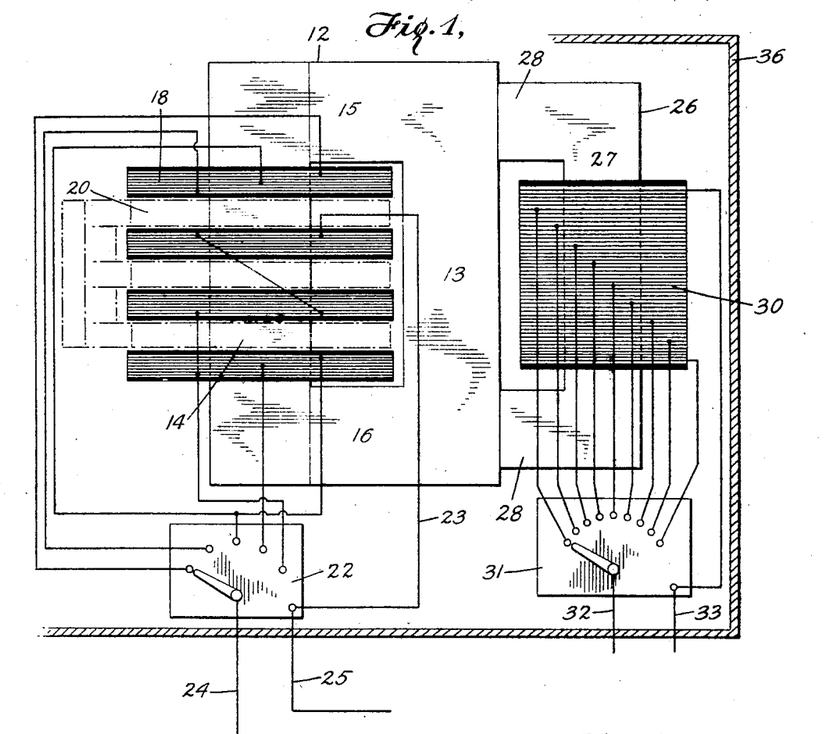
Fig. 1 is an elevational view, diagrammatic in certain respects, of a complete transformer and auxiliary current modifying mechanism constructed according to our invention.

Referring in detail to the drawings, there is illustrated in Fig. 1 one form of our invention. In this view there is shown a typical laminated, magnetic core 12 formed with the limbs 13 and 14 and yokes 15 and 16. The limb 14 of the core is shown as provided with the usual primary windings 18 and secondary windings 20. The primary coils have leads or taps brought out at various points and connected to a typical five-point regulator switch 22, the secondary having the usual terminals employed in electric welding or other types of electric apparatus.

It is believed unnecessary to describe in detail the various connections of the coils 18 and 20 and regulator 22, it being understood that electric current is supplied to the primary coils through the conductors 24 and 25, one of which connects to the adjustable element of the regulator, so that the number of turns in the primary coils of a transformer may be varied at will to change the secondary voltage, the output of the secondary being utilized in any usual manner, such for example as lighting, motive power, heating for welding, etc.

In order to control the current flow in the primary and secondary coils we provide an auxiliary U-shaped magnetic core member 26 formed with one limb 27 and two yoke portions 28 the core member being placed in magnetic conducting relation to the main magnetic core 12 in such manner that two complete magnetic circuits are formed with one limb 13 common to both magnetic circuits.

The limb 27 of the auxiliary core 26 is provided with an auxiliary primary winding 30 the number of turns of which may be adjusted through a multipoint regulator 31, if desired, current being supplied to the coils 30 through the supply lines 32 and 33. The regulator 31 by changing the number of effective turns in the auxiliary primary coil 30 correspondingly regulates the density of the lines of force in the core 26 as and for the purpose which appears more fully below.

Figures 2, 3:
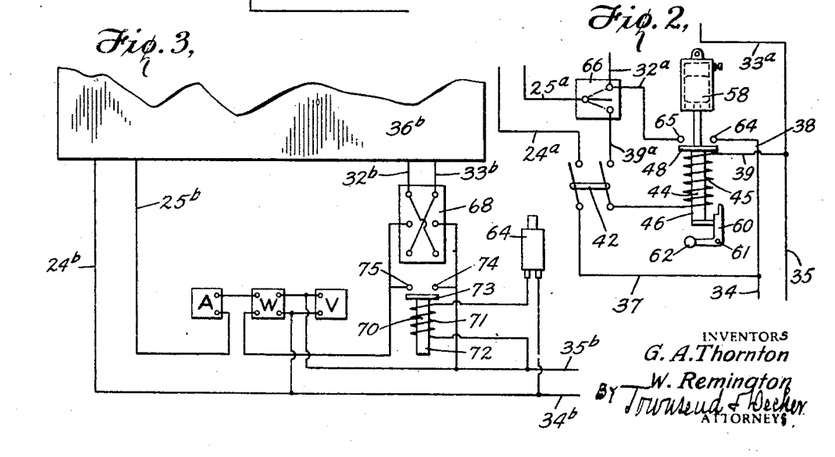
Fig. 2, illustrates one system of external circuit connection which may be employed.
Fig. 3 illustrates a modification of the external circuit controlling mechanism.

Any desirable external connections may be provided for conducting the electric current from the main power lines to the supply lines 24 and 25 and 32 and 33 leading respectively to the primary coils 18 and 30 the type of connection employed being dependent upon the purpose for which the transformer is intended to be used. Certain examples of such connections are indicated in Figs. 2 and 3 described below.

The entire transformer may be enclosed within a suitable housing as shown for example at 36, the transformer being embodied in any type of power mechanism as indicated above.

The operation of the above-described mechanism may be briefly described as follows: The transformer including the primary and secondary coils 18 and 20 embracing the magnetic core 12 may be used in the usual manner. Current is supplied to the coils 18 from the supply lines 24 and 25, through the five-point regulator 22, with the result that the voltage induced in the secondary may be manually regulated. When current is supplied to the auxiliary primary coil 30 through connections 32 and 33, the coil 30 being in either parallel or series relation with the main primary coil 18, magnetic lines of force are set up in the cores 12 and 26 having one limb 13 in common. The magnetic lines of force of the cores 12 and 26 may either boost or oppose one another in the common limb 13 with the result that the flux flow in the limb 14 of the main core 12 will be either increased or diminished. Since the current induced in the secondary 20 is proportional to the density of the magnetic lines of force in the limb 14, the current induced in the secondary will be modified accordingly, dependent upon the connections between the primary coils 18 and 30 and the main power lines.

When the number of turns in the coils 18 and 30 are substantially equal and the current supplied to these coils is substantially the same and when the lines of force excited in the core 12 are opposed in the limb 13 by those excited in the core 26, a state of equilibrium is reached in the limb 13 so that the entire magnetic flux assumes a different path which includes the yokes 15 and 28, limb 27, yokes 28 and 16, and limb 14. Under these conditions where the coils 18 and 30 are connected with the main power lines in series the voltage induced in the secondary is substantially decreased. Specifically it is reduced to one-half of the original voltage since the number of primary coils has been doubled. The result is that the output of the secondary and the input of the primary 18 are correspondingly decreased.

Under different conditions the above described mechanism may be used to prevent the transformer from being overloaded. This is accomplished by so connecting the coils 18 and 30, in either parallel or series relation, that at any instant the lines of force are traversing the cores 12 and 26 in opposite directions so that there is correspondence between the flux movements in the common limb 13. Under these conditions when for example the secondary is short circuited the common core member 13 becomes saturated thus limiting the output and input of the transformer.

It will be understood that under any of the conditions described above, the auxiliary coil may be brought into operation either manually or automatically, the polarity of the coils may be the same or opposite, the number of turns or volts per turn of either coil 18 or 30 may be regulated as desired and that the coils 18 and 30 may be placed in circuit with the main current supply in either parallel or series relation.

The operation will be further described below in connection with Figs. 4 to 11.

In Fig. 2 there are shown certain connections which may be employed for conducting electricity from the main power lines 34 and 35 to the main primary coils 18 and auxiliary primary coils 30 of Fig. 1, these connections providing for either automatic or manual control, this mechanism also providing for connecting the main and auxiliary primary coils in either parallel or series arrangements with the main power lines.

The mechanism shown in Fig. 2 includes branch conducting lines 37 and 38 leading from the main power line 34 and branch lines 39 and 33ª leading from the power line 35 to provide separate circuits leading to the primary coils. The branch lines 37 and 39 may be provided with a usual control switch 42 for opening or closing the circuit between the main power lines and the branch lines 24ª and 39ª leading to the transformer. An overload relay 44 is provided for the branch line 39, the same comprising the coil 45 enclosing a movable armature 46. The armature 46 carries a contact piece 48 and may be further provided with a speed limiting device or dash pot 58 to prevent a sudden flow of current from unintentionally operating the relay. The armature may, if desired, be held in operated current correcting position by means of a suitable latch as shown for example at 60. The latch 60 pivoted at 61 and formed with the weighted end 62 is arranged to engage beneath the portion of the plunger 46 to maintain it in elevated position until the same is manually released.

The branch line 38 includes the spaced contacts 64 and 65 which may be bridged by the contact piece 48 to close the circuit between the power line 34 and the conducting line 32ª adapted for connection with the conducting line 32 (Fig. 1) leading to the regulator 31. A selective switch 66 permits the connection of the conductor 25ª either to the conducting line 39ª leading to the branch line 39 or to the conductor 32ª adapted for connection with the connecting line 32. Obviously, if desired, a reversing switch may be introduced in the circuit leading to one of the coils 18 or 30 to cause the lines of force to either oppose or boost one another in the common limb 13 of the transformer core where the same transformer is intended to be used for a variety of purposes.

Referring now to the operation of the mechanism shown in Fig. 2, and considering the elements of the mechanism as connected to the corresponding elements of Fig. 1, it will be seen that when the switch 42 is closed, electric current is conducted from the power line 34 through the branch lines 37, 24ª and 24 to one terminal of the five-point regulator 22. The current then passes through a certain number of turns of the main primary coil 18, dependent upon the setting of the five-point regulator, the current returning through the connecting lines 23, 25, and 25ª, to the selective switch 66.

When the movable blade of the switch 66 is engaged with the terminal of the conductor 39ª the current passes through the coil 45 and branch line 39 to the other power line 35. Under these conditions no current passes through the auxiliary coil 30 and the transformer operates in the usual way. If from any cause, as by reason of short-circuiting the secondary 20 of the transformer, an overload is placed upon the transformer, the increased current flow through the coil 45 of the solenoid 44 elevates the armature 46 and causes the element 48 to bridge the contacts 64 and 65. Current is then supplied from the main power lines 34 and 35 directly to the auxiliary coil 30, the current passing through the branch line 38, terminals 64 and 65, branch lines 32ª, and 32 to one terminal of the regulator 31. The current after passing through the predetermined number of turns of the coil 30, as determined by the regulator 31, returns by way of the branch lines 33 and 33ª to the other power line 35. It will thus be seen that upon a predetermined current passing through the main primary coil 18 and relay coil 45 current is automatically supplied to the auxiliary coil 30 in parallel with the main primary coils 18 and the current flow is modified as set forth above in connection with Fig. 1.

When the switch 66 is operated to connect the branch line 25ª with the branch line 32ª, the contact piece 48 being out of engagement with the terminals 64 and 65, the current, after passing through the coils 18 and conducting lines 25 and 25ª, is conducted to the regulator 31 and auxiliary coils 30, the current returning through the connecting lines 33 and 33ª to the main power line 35. It is to be noted that under these conditions the current is conducted in series through the coils 18 and 30 and that the voltage and current are modified as described above it being understood that with either manual or automatic control the coils 18 and 30 may be designed to be placed in either parallel or series connection with the main power lines.

Referring now to Fig. 3, there is disclosed in this figure a modification of the external connections for the main and auxiliary primary windings. In this assembly the main lines 34ᵇ and 35ᵇ are connected through the distributing lines 24ᵇ and 25ᵇ to the main primary windings enclosed within the housing 36ᵇ, the construction of which may be the same as in Fig. 1. The current limiting coils within the housing 36ᵇ are supplied through conductors 32ᵇ and 33ᵇ connected through the reversing switch 68 with the distributing lines leading respectively to the main power line 35ᵇ and through the main primary coils and conductors 25$^b$ and 24$^b$ to the main line 34$^b$. Mechanism is provided in this embodiment of the invention for short-circuiting the auxiliary coil 30 which is within the housing 36$^b$, this means comprising a manual control switch 64 for controlling the current supply to a coil 71 of the relay 70, the coil encircling an armature 72 formed with a conducting member 73 capable of bridging the terminals 74 and 75 for short-circuiting the coil 30.

If desired the instruments A, W, and V representing respectively an ammeter, a watt-meter and a volt-meter may be connected in the primary circuits as indicated in Fig. 3.

When the assembly shown in Fig. 3 is used, the auxiliary coil 30 may be employed to either increase or diminish the output of the transformer by arranging the reversing switch 68 to cause the current to pass through the coil 30 in one direction or the other and to correspondingly cause the lines of force of the two magnetic circuits in the limb 13 to either assist or oppose the other as described in detail below.

It will be understood that the mechanism illustrated in Fig. 3 could be used equally well to open the circuit to the auxiliary coil (30) by having the contact piece 73 move out of engagement with the terminals 74 and 75 instead of moving into engagement therewith as described.

The apparatus shown in Figs. 1 and 3 is particularly useful in connection with flash welding where the metal to be welded requires preheating. When used for this purpose the contact piece 73 is maintained out of engagement with the terminals 74 and 75 during the preheating period. The main and auxiliary primary coils are thus connected in series and the voltage and current flow are correspondingly reduced. When it is desired to flash and complete the weld the auxiliary coil may be short circuited by means of the switch button 64 which closes the circuit through the coil 71 and moves the contact piece 73 into engagement with the terminals 74 and 75. The current from the main power lines 34$^b$ and 35$^b$ is then applied directly to the main primary coils 18 (Fig. 1) and due to the absence of any modifying influence from the auxiliary coil 30 the secondary voltage and current flow are rendered sufficiently high to complete the weld.

This apparatus is likewise available where a relatively high initial voltage is desired for example to break down a scale or other coating. The apparatus is adaptable to this use in that the coil 30 may first be short-circuited until the surface obstruction has been pierced after which the secondary voltage and current may be reduced by opening the short-circuiting switch at 74, 75, the weld being completed with a reduced secondary voltage caused by the introduction of the coil 30 into the primary circuit.

Figs. 4 to 8 illustrate diagrammatically a few of the many types of transformers which may be employed in connection with the present invention. It will be understood that these illustrations are not to be considered as exhaustive but that the invention is adaptable to other types of transformers.

Figures 4, 5, 6, 7, 8, 9, 10, 11:
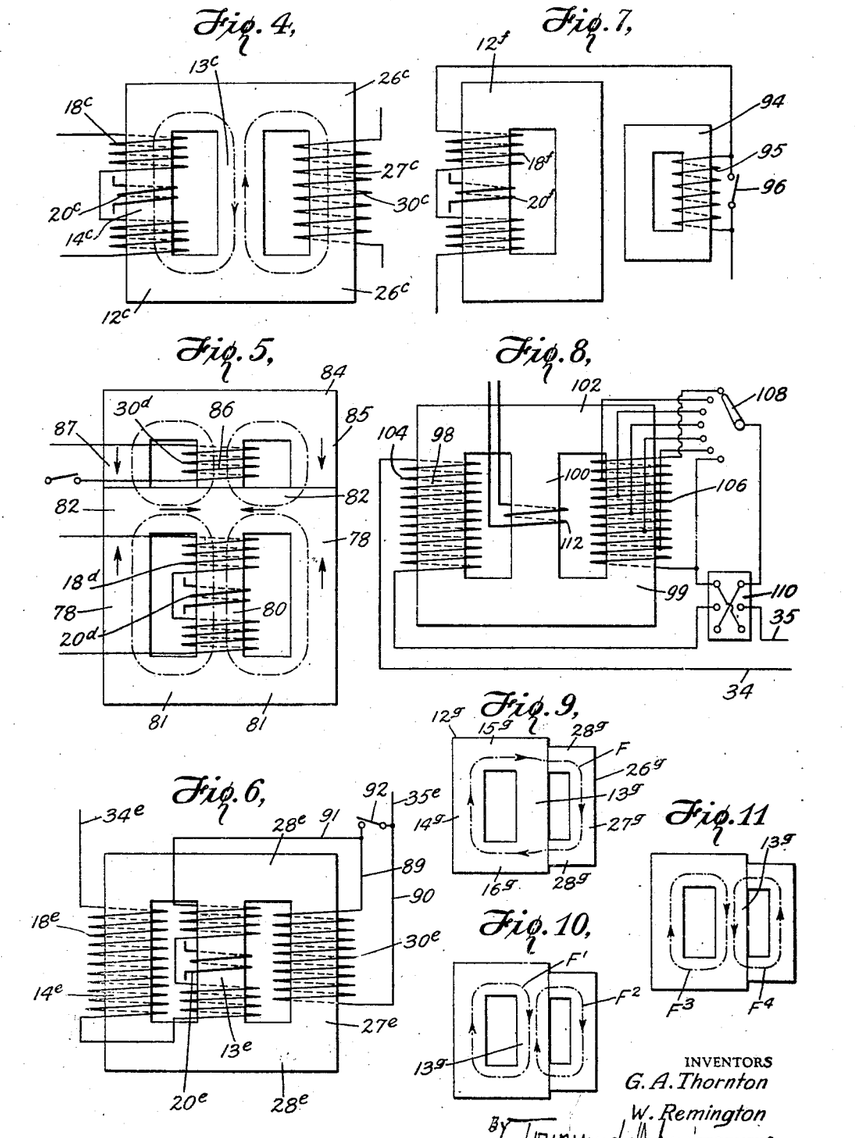
Figs. 4, 5, 6, 7 and 8 illustrate diagrammatically various modifications of the core, main and auxiliary primary windings and secondary windings which our invention may assume under different conditions.
Figs. 9, 10 and 11 illustrate diagrammatically the paths assumed by the lines of force under different operating conditions.

Referring now to Fig. 4 the transformer disclosed therein is similar to the type shown in Fig. 1. The main core 12$^c$ (Fig. 4) is provided with two limbs 13$^c$ and 14$^c$, the primary windings 18$^c$ and secondary windings 20$^c$ embracing the limb 14$^c$ thus providing a complete transformer with magnetic cores and primary and secondary windings.

The current correcting apparatus comprises an auxiliary magnetic core 26$^c$ placed or formed in magnetic conducting relation to the main core 12$^c$ and having the limb 27$^c$ thereof embraced by the auxiliary current modifying coil 30$^c$. Electric current may be supplied to the main primary coils 18$^c$ and auxiliary coils 30$^c$ by means of any desirable connections so that one or both of the coils, as desired, may be connected to the main power lines, the connection for the two coils placing them in either series or parallel relation with the main power lines and with the magnetic lines of force in the two magnetic circuits either opposing or boosting one another in the common limb 13$^c$ of the composite core dependent upon the connections employed. The arrows in Fig. 4 indicate one condition wherein the direction of movement of the magnetic fluxes are such as to oppose or buck one another in the common limb 13$^c$.

In Fig. 5 there is illustrated a typical shell-type transformer the core of which comprises the outer limbs 78 and the bridge limb 80 joined by the usual yokes 81 and 82. The main primary windings 18$^d$ and secondary windings 20$^d$ are mounted upon the bridge limb 80, it being understood that suitable connections are made with the terminals of the main primary and secondary windings for conducting electric current to and from the transformer. The above described construction forms a complete shell-type transformer of the usual type.

The present invention is applied in Fig. 5 by providing an auxiliary E-shaped magnetic core 84 with limbs 85, 86 and 87 placed in magnetic conducting relation with the main core and with the limbs of the auxiliary core corresponding to the limbs of the main core. The auxiliary core thus formed, which is in effect one-half of a complete magnetic core of a shell-type transformer, is designed to receive the auxiliary current correcting windings 30$^d$ upon the central limb portion 86. It will be understood that if desired the core 84 and auxiliary windings 30$^d$ may be duplicated at the other end of the transformer shown in Fig. 5 to increase the effectiveness of the current correcting apparatus if desired.

Any suitable arrangements of the connections for the main primary coils 18$^d$ and auxiliary coils 30$^d$ of Fig. 5 may be provided as in each of the other embodiments herein disclosed dependent upon the purpose and method of operation of the transformer. In other words, the coils may be connected in series or parallel and may have any desired number of turns and may further be provided with adjusting means for the number of turns as will be readily understood.

In operation the main transformer shown in Fig. 5 is modified in its action by the auxiliary core and coils, as in the other forms of the invention, the boosting or bucking or neutralizing of the fluxes or saturation of the core taking place in the common yoke portions 82 of the core. The arrows in Fig. 5 indicate a direction of movement of the fluxes such that there is correspondence between the movements of the lines of force produced in the main transformer and those produced in the auxiliary core thus resulting in a boosting of the fluxes in the common limb 82. A most important advantage of this arrangement is that the auxiliary core and coil operate in conjunction with the main transformer core and coils to produce lines of force of sufficient density to saturate the core portions 82, thus limiting the possible output of the transformer and correspondingly limiting the current flow in the primary coils under extreme conditions as for example when the secondary is short-circuited.

In Fig. 6 we have illustrated a modification of our invention which is of more general application in that it gives a wider possible range to the apparatus. According to this form of the invention the main core comprising the limbs 13$^e$ and 14$^e$ receives the primary and secondary windings 18$^e$ and 20$^e$ respectively, the primary windings 18$^e$ embracing both limbs 13$^e$ and 14$^e$, the secondary windings embracing the limb 13$^e$. The auxiliary core comprises the limb 27$^e$ and yokes 28$^e$, with the yokes in magnetic conducting relation with the main magnetic core as in the other forms of the invention. The current correcting windings 30$^e$ are mounted upon the limb 27$^e$ as in the first form of the invention.

Various connections may be made for the purpose of including the various coils, the assembly shown in the present embodiment (Fig. 6) having certain definite advantages as stated below and including the conductors 89 and 90 leading respectively to the conductor 91 and main line 35$^e$ The conductor 91 leads to the main primary coils 18$^e$, the coils being suitably connected to the main power line 34$^e$ as will be understood. A short circuiting switch 92 is provided for the purpose of shunting the current past the coils 30$^e$ when the switch is closed or, when the switch is open, causing the current to pass through auxiliary coils 30$^e$ in series with the main coils 18$^e$.

This device may be operated in various ways to achieve different results. If it is desired to have an initial low secondary voltage the switch 92 may be closed thus short-circuiting the coil 30$^e$, in which case the current induced in the secondary 20$^e$ will be that resulting from the excitation of the main primary coils 18$^e$ only. If it is desired thereafter to increase the output of the transformer the short-circuiting switch 92 may be opened thus increasing the magnetic lines of force in the common limb 13$^e$ to an extent dependent upon the number of turns in the auxiliary coil 30$^e$.

It will be understood that the reverse of this operation may take place and that the current induced in the secondary may be modified by suddenly closing the switch 92 thereby shunting the auxiliary coil 30$^e$.

The above operation has assumed the coils 30$^e$ and 18$^e$ being wound upon the limbs 14$^e$ and 27$^e$ respectively in the same directions so that they will produce corresponding flux movements at any particular instant in the common limb 13$^e$. This apparatus is particularly useful where the polarity of one of the windings 18$^e$ or 30$^e$ is reversed so as to produce bucking or opposing lines of force in the common limb 13$^e$. Under these conditions, if an initial relatively high voltage is desired in the secondary 20$^e$ this may be accomplished by closing the switch 92 so that the main transformer operates in the usual manner with the primary coil 18$^e$ exciting magnetic lines of force in the main core, a current flow thereby being induced in the secondary coil 20$^e$. Opening of the switch 92 thereafter causes the primary current to pass through the auxiliary coil 30$^e$ thus producing bucking or opposing lines of force in the common limb 13$^e$, this action having the result of producing a new magnetic flux path threading only the outer limbs of the composite core. A relatively small current will accordingly be induced in the secondary which is mounted upon the bridge or central limb 30$^e$ of the complete core, since the volts per turn of the secondary are determined by the flux value in the portion of the core embraced by the secondary. Obviously the reverse of this operation may take place by having the switch 92 initially opened and thereafter closing the switch.

It will be noted that the extreme variations produced by the mechanism shown in Fig. 6 is produced without excessive arcing or excessive mechanical or electrical strains in the transformer since the primary circuit is at no time open but instead a complete closed primary circuit is provided at all times during which the apparatus is in use.

In Fig. 7 there is disclosed a current controlling mechanism wherein the commingling of the fluxes is not present. The apparatus disclosed in Fig. 7 comprises a complete transformer formed with a magnetic core 12ᶠ having primary coils 18ᶠ and secondary coils 20ᶠ thereon which may be of any usual or desirable construction. The current limiting devices comprise a separate magnetic core 94 embraced by an auxiliary coil 95. The coils 18ᶠ and 95 are arranged to be connected in series relation, a short circuiting switch 96 being provided so that when desired the auxiliary coil 95 may be short circuited.

The form of the apparatus shown, in Fig. 7, while it differs substantially from the other forms of the invention herein disclosed, operates to materially limit the current flow through the primary coils due to the counter electromotive force induced in the coil 95 when the circuit through the coil 95 is closed, the output from the transformer being correspondingly limited.

The form of the invention illustrated in Fig. 8 constitutes a current regulating device of general application. This mechanism includes a composite magnetic core formed as in the core of a shell type transformer in that it is formed with the outer limbs 98 and 99 and the bridge limb 100, the limbs being joined by suitable yokes 102.

In Fig. 8 we have shown the main primary coil 104 and the auxiliary primary coil 106 mounted upon the outer limbs 98 and 99 respectively of the transformer core. The coils 104 and 106 are arranged in series relation with the main power lines. Either one or both of the coils 104 and 106 may be formed with regulators as in Fig. 1 above, however, it is believed sufficient if one coil 106 is provided with the regulator 108 as indicated in Fig. 8. The polarity reversing switch 110 may be provided in order to give the greatest possible range to the apparatus shown in this figure. The secondary coils 112 are mounted upon the bridge 100 and have their terminals connected to the power device (not shown) with which the apparatus is to be used as will be understood.

In the operation of this form of the invention, when the coils 104 and 106 are arranged in either parallel or series relation, with the same number of turns in each and with the polarity of the coils the same so that there is a bucking or opposing of the fluxes in the common limb 100, there is a neutralizing effect as respects the magnetic lines of force in the bridge 100 so that the flux assumes a path traversing the entire outer limbs of the transformer thus passing through both exciting coils but without inducing any current flow in the secondary even though the secondary should be short-circuited. Under these conditions there is no output from the secondary but instead a counter-electromotive force is induced in the coils 104 and 106 and the transformer is in the condition of the usual transformer at zero load. By changing the number of turns in the coil 106 a certain proportion of the flux is caused to pass through the bridge limb 100 thus inducing a certain current flow in the secondary 112. When the arm 108 is so adjusted that the main current supply does not pass through any of the turns of the coils 106 these coils are short circuited and the transformer operates in the usual manner with the primary coils 104 and secondary coils 112 embracing the limbs 98 and 100 respectively of the transformer core.

The output of the transformer can be increased by reversing the polarity of the coil 106 by means of the reversing switch 110. The exciting influence of the coils 104 and 106 then becomes additive and the lines of force passing through the bridge limb 100 and through the secondary coil 112 is the result of the combined actions of the coils 104 and 106 since the density of the lines of force in the bridge limb 100 under these conditions is the sum of the lines of force excited in the limb 98 by the coil 104 and in the limb 99 by the coil 106.

It will thus be seen that according to this form of the invention a current controlling mechanism of general application is provided, the mechanism permitting a variation in the possible output of the transformer from zero to the maximum output of the transformer.

In Figs. 9, 10 and 11 the paths of the magnetic lines of force under the different operating conditions are illustrated diagrammatically. The composite cores illustrated in these figures are similar to the core shown in Fig. 1 and comprise the main transformer cores 12ᵍ formed with the limbs 13ᵍ and 14ᵍ and with the yokes 15ᵍ and 16ᵍ the auxiliary core portion 26ᵍ comprising the limb 27ᵍ and the yokes 28ᵍ.

In Fig. 9 the flux flow is indicated by the dotted line and arrows, the condition indicated prevailing when the lines of force are neutralized in the central or common limb 13ᵍ.

In Fig. 10 the two magnetic circuits indicated by the numerals $F^1$ and $F^2$ are shown as bucking or opposing one another in the common limb 13ᵍ with the result that they modify or neutralize one another to a certain extent but without entirely changing the path of flow of the lines of force.

In Fig. 11 the dotted lines $F^3$ and $F^4$ indicate the flux paths when the directions of movement of the lines of force at any particular instant correspond in the common limb 13ᵍ with the results noted above. One particularly desirable result under these conditions is the provision of an overload limiting device. This result follows from the fact that the core element 13ᵍ becomes saturated when a certain degree of density of the lines of force occurs therein and a further output of the transformer is prevented even with a short circuited secondary, it being understood that it is preferable, where an overload limiting device is contemplated, to have the secondary mounted on some part of the core other than the common limb 13ᵍ.

In summing up the operation of the various forms of the apparatus herein disclosed it is apparent that we have provided for effectively decreasing or increasing the voltage and the current flow in the secondary coils of a transformer and that these variations will correspondingly limit the input or current flow in the primary coils. The mechanism permits the variation from zero to the possible maximum output of the transformer without opening the primary or secondary circuits and without causing excessive arcing and without creating severe electrical or mechanical strains in the apparatus. Furthermore the change from one voltage and current condition to another is capable of being performed instantly by either manual or automatic means. The current correcting or modifying apparatus which provides for varying the transformer conditions by directly influencing the fluxes performs its function without consuming any material amount of electrical energy.

It will be understood that the secondary voltage is varied by reason of the variation of the flux value in the portion of the core embraced by the secondary, the secondary being mounted upon the portion of the main magnetic core which produces the best results for the particular use for which the apparatus is designed. The mechanism herein disclosed provides for different flux values in different portions of the magnetic core, corresponding voltages being induced in the secondaries embracing the different portions of the core. The flux conditions and secondary voltages may be readily changed within wide limits as fully set forth above. Obviously the directing of the magnetic flux into a path threading mainly or entirely the outer limbs of the core as indicated for example in Fig. 9 has the effect, when the main primary and secondary coils and auxiliary coils are placed as shown in Figs. 1 and 4, of causing the flux to transverse both the main primary and auxiliary coils. When these last-mentioned coils are arranged in series relation the number of effective primary turns is thereby increased and the secondary voltage correspondingly decreased.

Applicants are accordingly enabled by means of the mechanism herein disclosed to influence the flux movement and vary the flux path and to vary the number and relation of the effective primary coils so as to regulate at will the secondary voltage and current flow.

While we have illustrated various applications of the basic principle of the invention to show its adaptability to the uses enumerated it will be readily understood that the adaptations herein presented are merely illustrative and that various other embodiments may be provided without departing from our invention.

We claim as our invention:

1. In an alternating current electric transformer, main primary and secondary coils, a main flux path passing through said primary and secondary coils, an auxiliary controlling coil having a flux path a portion of which coincides with a portion only of said main flux path free of said main coils.

2. In an alternating current electric transformer, main primary and secondary coils, a core forming a complete flux path passing through said main primary and secondary coils, an auxiliary core member providing a flux path, without said main coils, a portion only of which coincides with a portion of said first-named flux path, and an auxiliary current controlling coil encircling a portion of said auxiliary core remote from said first-named flux path.

3. In an alternating current electric transformer, a composite core member formed with a plurality of complete magnetic circuits having portions common to the different circuits, main primary and secondary windings encircling portions of said core member forming one complete magnetic circuit, and auxiliary windings encircling a portion of said core without said last named magnetic circuit and main windings.

4. In combination with a transformer formed with primary and secondary windings and a main core forming a complete magnetic circuit passing through said primary and secondary windings, electrically actuated means positioned without said magnetic circuit for directly influencing the magnetic flux in said core and indirectly influencing the current flow induced in said secondary.

5. In combination with a transformer formed with primary and secondary windings and a main core forming a complete magnetic circuit passing through said primary and secondary windings, electrically actuated means positioned without said magnetic circuit for directly influencing the magnetic flux in said core and indirectly influencing the current flow induced in said secondary, and means for controlling said last named means.

6. In combination with a transformer formed with primary and secondary windings and a main core forming a complete magnetic circuit passing through said primary and secondary windings, means including an auxiliary magnetic core having a portion only thereof in common with said first named core for directly influencing only the flux passage in said main core.

7. In combination, a magnetic core formed with a plurality of separate magnetic flux paths, said core being formed with a portion common to both said flux paths, primary and secondary windings surrounding a portion of said core forming one flux path only, and an auxiliary corrective winding surrounding a portion of said core remote from said last named flux path.

8. In combination with a complete transformer including primary and secondary windings and a magnetizable core embraced thereby, means for producing an auxiliary magnetic flux in a portion only of said core for indirectly influencing the current flow in said transformer.

9. In an alternating current electric transformer, a magnetizable core, main primary and secondary windings, means for varying the output of said transformer, said means including an auxiliary magnetizable core element positioned without said main windings, an auxiliary winding thereon, means for conducting electric current to said primary winding and to said auxiliary winding and means for interrupting the flow of current to said auxiliary winding.

10. In an alternating current electric transformer, a magnetizable core, main primary and secondary windings, means for varying the output of said transformer, said means including an auxiliary magnetizable core element and an auxiliary primary winding thereon, means for conducting electric current in series through said primary and auxiliary windings, and means for short circuiting one of said primary windings to cause said current to be passed through said other primary winding only.

11. In an alternating current electric transformer, a magnetizable core, primary and secondary windings, means for varying the output of said transformer, said means including a current limiting coil connected in series relation with said primary winding, means for conducting electric current to said primary winding and to said current limiting coil and means for short circuiting said current limiting coil.

12. In combination with an alternating current electric transformer provided with a magnetizable core embraced by primary and secondary windings, a regulating coil positioned without said core, an auxiliary magnetizable core embraced by said regulating coil and positioned to convey flux to and through a portion only of said main core, and means for conducting electricity in series through said primary winding and said regulating coil.

13. In combination with an alternating current electric transformer including primary and secondary windings embracing a magnetizable core, a current limiting device including a corrective coil embracing an auxiliary magnetizable core, said auxiliary core being extended to a position in magnetic conducting relation to said first named core, means for conducting electricity in series through said primary winding and current limiting coil and means for controlling the effectiveness of said current limiting device.

14. In an alternating current electric transformer, a magnetizable core, primary and secondary windings, means for varying the output of said transformer, said means including an auxiliary magnetizable core element and an auxiliary winding thereon, means for conducting electric current to said primary winding and to said auxiliary winding and current responsive means for controlling the flow of current to said auxiliary winding.

15. In an alternating current electric transformer, a magnetizable core, main primary and secondary windings, means for varying the output of said transformer, said means including an auxiliary magnetizable core element positioned without said main windings, an auxiliary winding thereon, means for conducting electric current to said primary winding and to said auxiliary winding and means for reversing the direction of the flow of current through said auxiliary winding.

16. A current controlling device comprising a magnetizable core provided with a plurality of outer limbs and a central bridge member with yokes connecting said limbs and bridge member, main and auxiliary primary windings on said outer limbs and a secondary winding mounted in inductive relation only to the said limb on which said main primary winding is mounted.

17. In a current controlling apparatus, a transformer including a magnetic core, a secondary associated with one portion of said core, and means for directly influencing the magnetic lines of force for causing them to traverse or to avoid the portion of the core with which said secondary is associated.

18. In a current controlling apparatus, a transformer including a magnetic core, primary and secondary windings embracing portions thereof, a magnetic core portion avoiding said secondary, and regulable means for causing the magnetic lines of force in said core to traverse or to avoid the portion of said core encircled by said secondary.

19. In a current controlling apparatus, a transformer including a magnetic core, primary and secondary windings encircling portions thereof, a magnetic core portion avoiding said secondary, and regulable electrically actuated means for causing the magnetic lines of force in said core to traverse or to avoid the portion of said core encircled by said secondary.

20. In an alternating current electric transformer, a magnetic core embraced by main primary and secondary windings and an auxiliary winding, means for connecting said main and auxiliary windings in series relation and for simultaneously causing the magnetic lines of force threading the main primary to thread the auxiliary coil.

21. In an alternating current electric transformer comprising a magnetic core embraced by main primary and secondary windings, means for varying the secondary voltage, said means comprising an auxiliary winding placed in flux producing relation with respect to a portion of said magnetic core and means for connecting said auxiliary coil in series with said primary coil.

22. In an alternating current electric transformer provided with main primary and secondary windings placed in embracing relation with respect to the flux path of a main magnetic core, means for varying the secondary voltage, said means comprising an auxiliary winding position in non-embracing relation with respect to said main flux path and means for connecting said auxiliary coil in series with said main primary winding and simultaneously creating a new flux path threading said main primary and auxiliary winding.

Signed at Lynn, in the county of Essex and State of Massachusettes this 10th day of March A. D. 1927.

GEORGE A. THORNTON.
WOLCOTT REMINGTON.